United States Patent
Totsuka et al.

(10) Patent No.: US 8,982,548 B2
(45) Date of Patent: Mar. 17, 2015

(54) APPARATUS OPENING AND CLOSING MECHANISM, AND INFORMATION APPARATUS

(75) Inventors: Takahiro Totsuka, Nagano (JP); Akira Hanatsuka, Tokyo (JP); Shingo Harada, Nagano (JP)

(73) Assignee: Sony Corporation (JP)

( * ) Notice: Subject to any disclaimer, the term of this patent is extended or adjusted under 35 U.S.C. 154(b) by 239 days.

(21) Appl. No.: 13/329,703

(22) Filed: Dec. 19, 2011

(65) Prior Publication Data

US 2012/0162879 A1 Jun. 28, 2012

(30) Foreign Application Priority Data

Dec. 28, 2010 (JP) ................. P2010-293306

(51) Int. Cl.
*H05K 7/00* (2006.01)
*G06F 1/16* (2006.01)

(52) U.S. Cl.
CPC ............ *G06F 1/1681* (2013.01); *G06F 1/1616* (2013.01); *G06F 1/1624* (2013.01)
USPC ............ 361/679.27; 361/679.01; 361/679.09; 361/727; 455/575.1; 455/575.4

(58) Field of Classification Search
CPC ............ H04M 1/0235; H04M 1/0239; H04M 1/0222; G06F 1/1624; G06F 1/1616
USPC .................. 361/679.01, 679.09, 679.27, 727; 455/575.1, 575.4
See application file for complete search history.

(56) References Cited

U.S. PATENT DOCUMENTS

| | | | |
|---|---|---|---|
| 2005/0113154 A1* | 5/2005 | Park et al. | 455/575.4 |
| 2007/0030634 A1* | 2/2007 | Maskatia | 361/683 |
| 2007/0105606 A1* | 5/2007 | Yoon et al. | 455/575.4 |
| 2007/0252202 A1* | 11/2007 | Park et al. | 257/335 |
| 2008/0058039 A1* | 3/2008 | Lee et al. | 455/575.4 |
| 2009/0247247 A1* | 10/2009 | Jang | 455/575.4 |
| 2010/0035669 A1* | 2/2010 | Jang et al. | 455/575.4 |
| 2010/0099467 A1* | 4/2010 | Lee | 455/575.4 |
| 2010/0113110 A1* | 5/2010 | Lee | 455/575.4 |
| 2010/0118487 A1* | 5/2010 | Ou et al. | 361/679.55 |
| 2010/0226089 A1* | 9/2010 | Wang et al. | 361/679.55 |
| 2010/0285852 A1* | 11/2010 | Stephenson | 455/575.4 |
| 2010/0291979 A1* | 11/2010 | Jeong et al. | 455/575.4 |
| 2011/0032668 A1* | 2/2011 | Lee | 361/679.01 |

(Continued)

FOREIGN PATENT DOCUMENTS

JP 2008-113067 A 5/2008
JP 2010-087991 A 4/2010

*Primary Examiner* — Hoa C Nguyen
*Assistant Examiner* — James Wu
(74) *Attorney, Agent, or Firm* — Lerner, David, Littenberg, Krumholz & Mentlik, LLP

(57) ABSTRACT

An apparatus opening and closing mechanism includes: a slide mechanism by which a first casing and a second casing are slidably connected to each other and which effects transition of position state of the first casing and the second casing between a closed state and an open state; and a hinge mechanism by which the first casing and the second casing are rotatably connected to each other. The slide mechanism includes: a first holder fixed to the first casing; a second holder which is fixed to the second casing and by which the first slider is supported so as to be movable in the sliding direction; and an elastic member which has one end fixed to the first holder and the other end fixed to the second holder and which extends and contracts according to movement of the first casing and the second casing at the time of sliding.

10 Claims, 12 Drawing Sheets

(56) References Cited

U.S. PATENT DOCUMENTS

2011/0075333 A1* 3/2011 Duan et al. .............. 361/679.01
2011/0096479 A1* 4/2011 Wu et al. .................. 361/679.01
2012/0077555 A1* 3/2012 Jung ......................... 455/575.4
2012/0154999 A1* 6/2012 Park ......................... 361/679.01

* cited by examiner

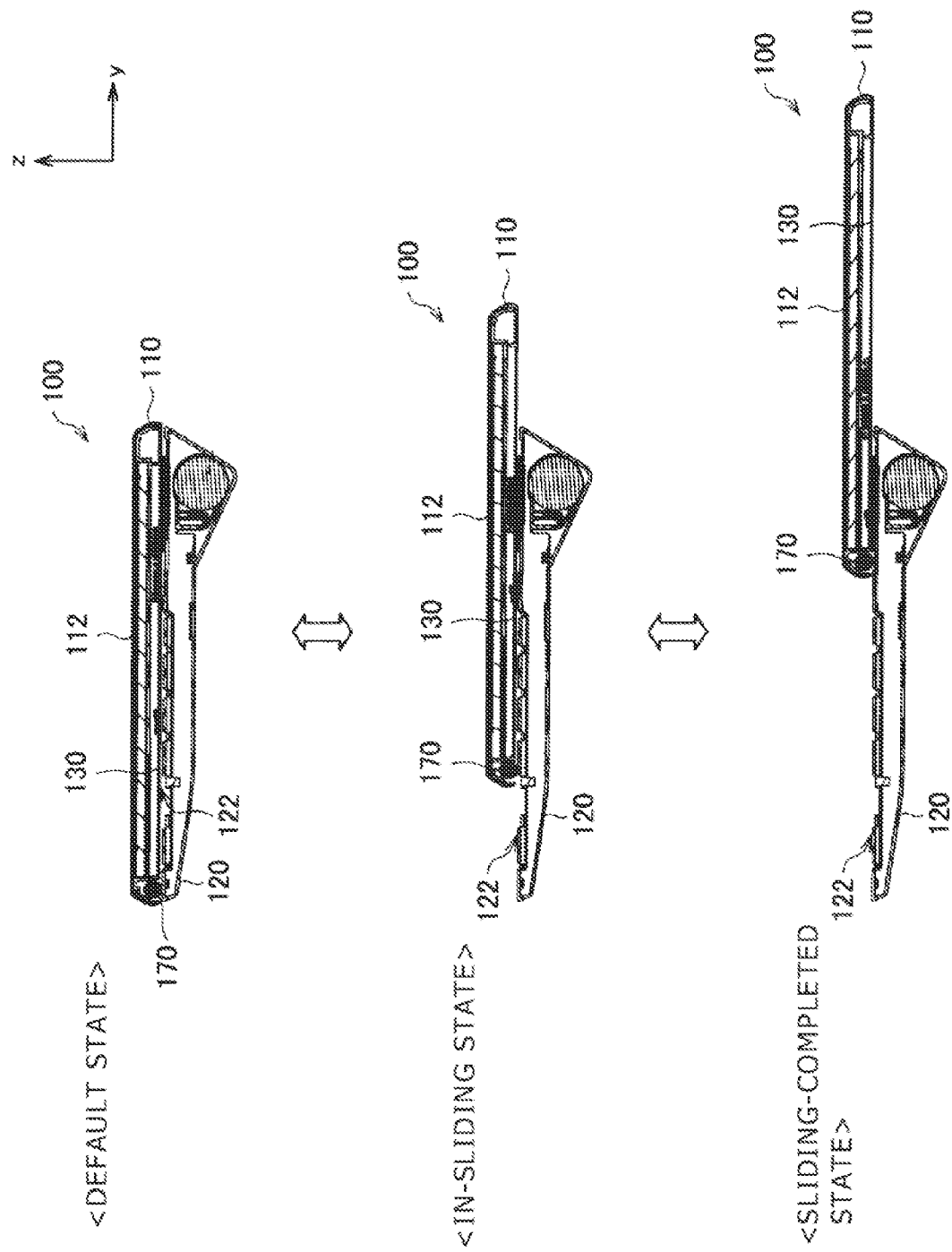

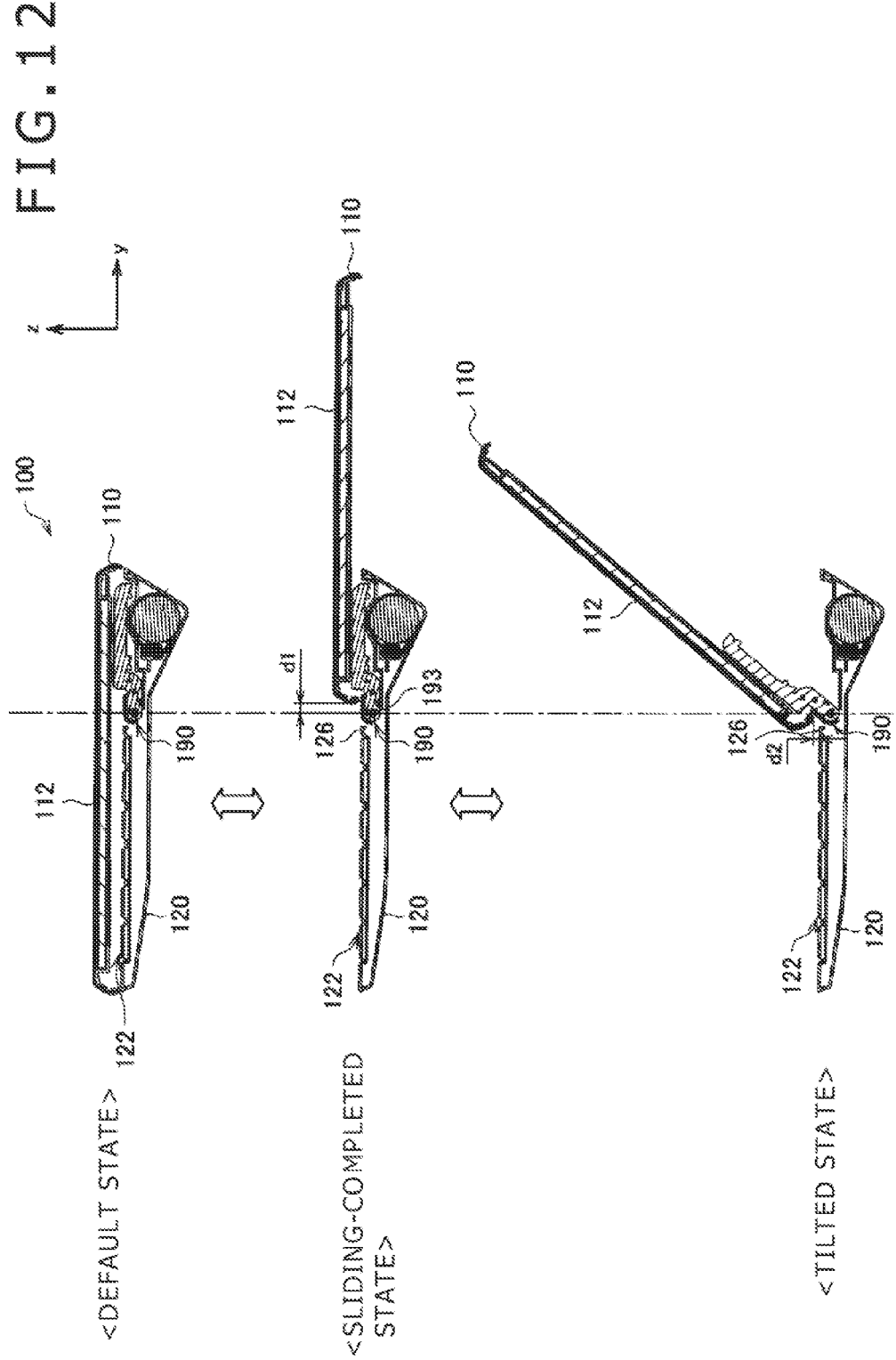

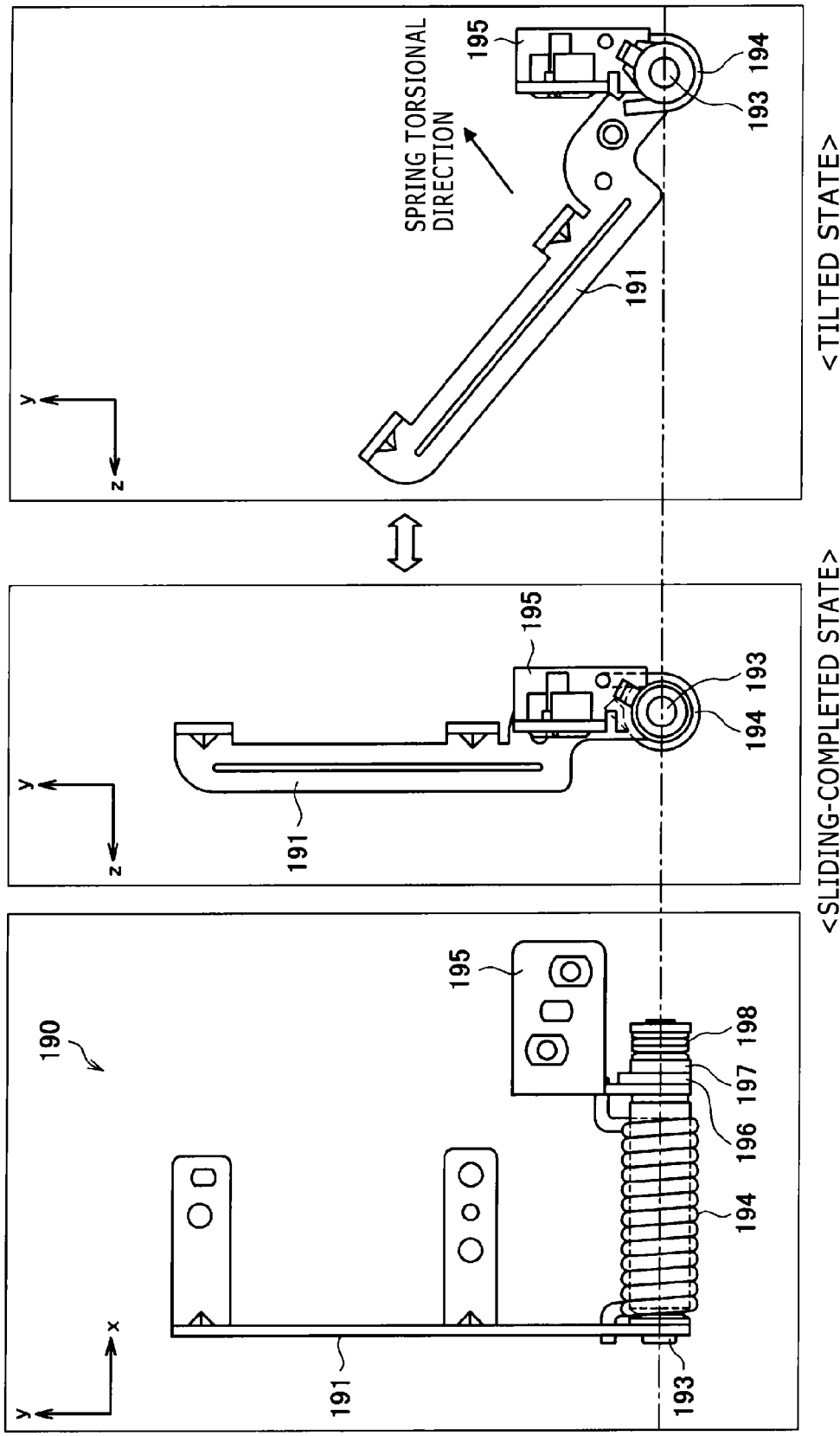

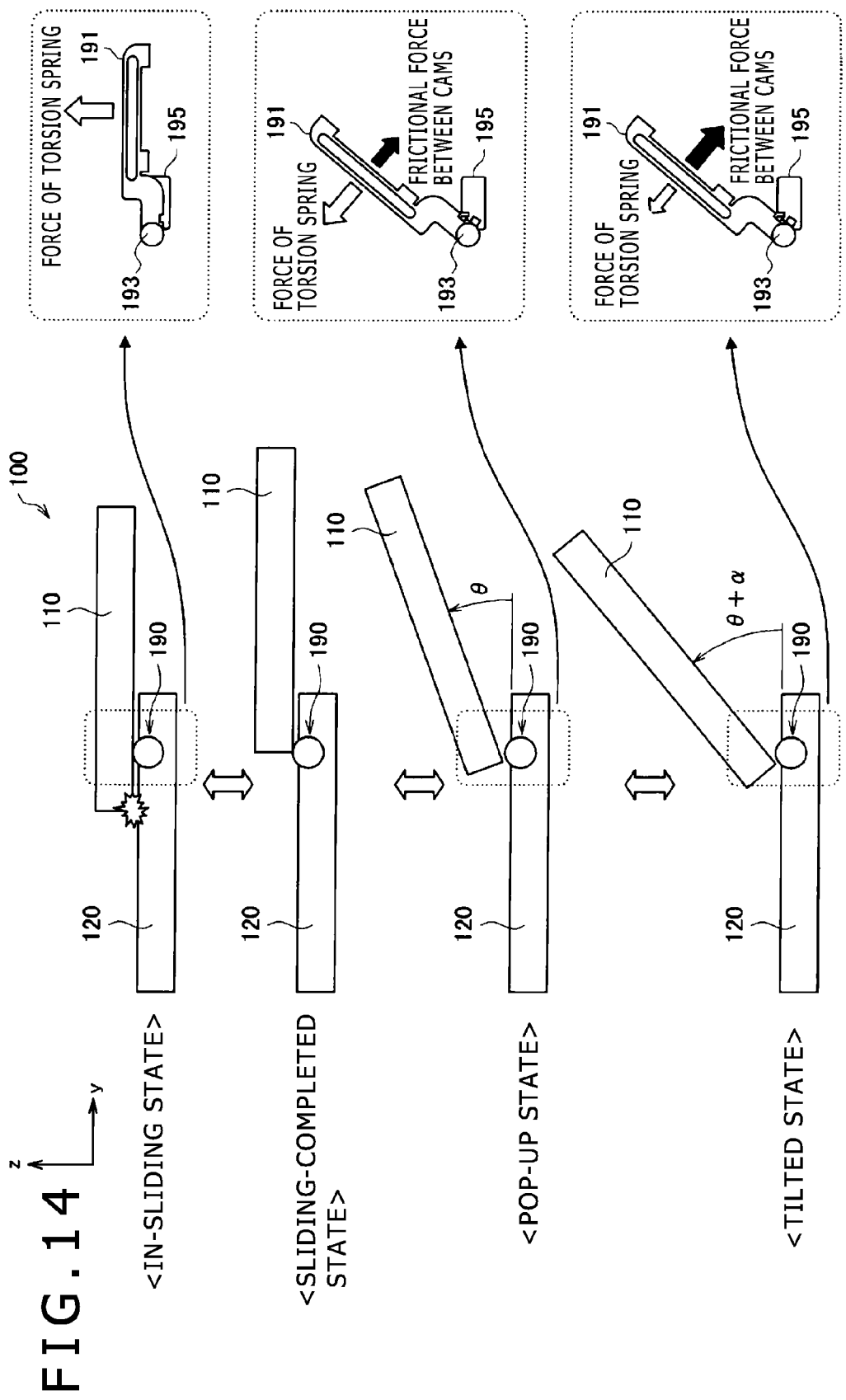

APPARATUS OPENING AND CLOSING MECHANISM, AND INFORMATION APPARATUS

CROSS-REFERENCE TO RELATED APPLICATION

The present application claims priority from Japanese Patent Application No. JP 2010-293306 filed in the Japanese Patent Office on Dec. 28, 2010, the entire content of which is incorporated herein by reference.

BACKGROUND

The present technology relates to an apparatus opening and closing mechanism and an information apparatus, particularly to an apparatus opening and closing mechanism for an information apparatus including a first casing and a second casing.

In information apparatuses, such as mobile information terminals, e.g., cellular phones, PDAs, etc. and mobile personal computers, an apparatus with a configuration in which a first casing provided with a display unit for displaying information and a second casing including a keyboard having input keys and/or buttons are coupled to each other is generally used. In such an information apparatus, according to the mode of use, the first casing and the second casing are slid or rotated (tilted) relative to each other, whereby the information displayed on the display unit is made easy to see or inputting of information through the input keys and the like is facilitated.

In relation to the above, for example, Japanese Patent Laid-Open No. 2008-113067 discloses an electronic device which includes a first electronic component having a display, a second electronic component having a keyboard, and a coupling for turnably connecting the first and second electronic components. In addition, Japanese Patent Laid-Open No. 2010-87991 discloses a portable information apparatus having an opening and closing device by which a first casing and a second casing can be opened and closed through sliding in forward-backward direction and, in the opened state, the second casing can be raised relative to the first casing.

SUMMARY

In the above-mentioned information apparatuses according to the related art, there has been a problem that when a slide mechanism for slidably connecting the first casing and the second casing is made to be invisible to the user, the maximum slide amount attained by shifting the first casing and the second casing as far as possible from each other is difficult to enlarge. For instance, in the case where a keyboard is provided at that part of the second casing which is exposed by sliding the first casing relative to the second casing, the size of the keyboard is restricted by the maximum slide amount. Therefore, an attempt to enlarge the size of the keyboard for permitting easier input of information through the keys would be unsuccessful, or, rather, the keyboard size should be reduced, because of the restriction imposed by the maximum slide amount.

In the case where such an information apparatus as above is used on a desk, usability is enhanced if an angle can be formed between the display unit possessed by the first casing and the keyboard possessed by the second casing, like a clamshell-type personal computer according to the related art. However, where a hinge mechanism for permitting relative rotation (tilting) of the first casing and the second casing is provided together with the above-mentioned slide mechanism, a problem would arise from the installation position of the hinge mechanism. Specifically, if the hinge mechanism is provided at a position at which respective end portions (set ends) of the first casing and the second casing overlap with each other, after the first casing and the second casing are slid, and at which the first casing and the second casing can be rotated relative to each other, it is very difficult to hide the slide mechanism. On the other hand, if the hinge mechanism is provided at other position than the set ends, it may be necessary to cut out a part of the casing in order to install the hinge mechanism, which impairs the design of the information apparatus.

Thus, there is a need for a novel and improved apparatus opening and closing mechanism, and an information apparatus having the apparatus opening and closing mechanism, such that a slide mechanism and a hinge mechanism can be used jointly and that operability can be enhanced.

According to an embodiment of the present technology, there is provided an apparatus opening and closing mechanism including: a slide mechanism by which a first casing and a second casing are slidably connected to each other and which permits transition of position state of the first casing and the second casing between a closed state in which an overlapping region of the first casing and the second casing is maximized and an open state in which the overlapping region of the first casing and the second casing is minimized; and a hinge mechanism by which the first casing and the second casing are rotatably connected to each other. The slide mechanism includes a first holder fixed to the first casing, a second holder which is fixed to the second casing and by which the first holder is supported so as to be movable in a sliding direction, and an elastic member which has one end fixed to the first holder and the other end fixed to the second holder and which extends and contracts according to movement of the first casing and the second casing at the time of sliding. The elastic member is so configured that the elastic member contracts most in an in-sliding state of the first casing and the second casing and that its extension amount in the closed state is smaller than its extension amount in the open state, and the hinge mechanism becomes able to function when the first casing and the second casing are brought into the open state.

Here, the difference between the width of the first holder in the sliding direction and the width of the second holder in the sliding direction may be smaller than ⅓ times the larger one of the widths.

In addition, the hinge mechanism may include: a rotating shaft serving as a center of rotation for the first casing and the second casing; a first fixed section fixed to the first holder and a second fixed section fixed to the second holder, with one of the first and second fixed sections being rotatably provided on the rotating shaft and with the other of the first and second fixed sections being fixed to the rotating shaft; a torque member which has one end fixed to the first fixed section and the other end fixed to the second fixed section and which produces a torque in a rotating direction of the first casing and the second casing; and a friction member which produces a frictional force for impeding movement of the first casing and the second casing in the rotating direction. In addition, the frictional force produced by the friction member may be smaller than the torque produced by the torque member when an opening/closing angle, which is an angle formed between the first casing and the second casing, is not greater than a predetermined angle, and the frictional force produced by the friction member may be greater than the torque produced by the torque member when the opening/closing angle is greater than the predetermined angle.

In this instance, the torque member may have a torsion spring, and the friction member may include two cams provided juxtaposedly in the direction of the rotating shaft, and a friction elastic member which presses the two cams.

In addition, in the open state, a rear end portion as an end portion of the first casing slid on the second casing by being pushed in at the time of transition from the closed state to the open state may be located at a position deviated in a pushing-in direction from the position of the rotating shaft of the hinge mechanism in the sliding direction.

Furthermore, the first holder may have a roller which rolls on a surface, facing the first casing, of the second casing at the time of sliding of the first casing and the second casing. The roller may be composed, for example, of an elastic member.

Besides, the hinge mechanism may include: a rotating shaft serving as a center of rotation for the first casing and the second casing; a first fixed section fixed to the first holder and a second fixed section fixed to the second holder, with one of the first and second fixed sections being rotatably provided on the rotating shaft and with the other of the first and second fixed sections being fixed to the rotating shaft; and a friction member which produces a frictional force for impeding movement of the first casing and the second casing in the rotating direction.

In addition, according to another embodiment of the present technology, there is provided an information apparatus including: a first casing having a display unit for displaying information; a second casing which is provided to overlap with the first casing and which has an input unit for input operations; and an apparatus opening and closing mechanism including a slide mechanism by which the first casing and the second casing are slidably connected to each other and which permits transition of position state of the first casing and the second casing between a closed state in which an overlapping region of the first casing and the second casing is maximized and an open state in which the overlapping region of the first casing and the second casing is minimized, and a hinge mechanism by which the first casing and the second casing are rotatably connected to each other. The slide mechanism includes a first holder fixed to the first casing, a second holder which is fixed to the second casing and by which the first holder is supported so as to be movable in a sliding direction, and an elastic member which has one end fixed to the first holder and the other end fixed to the second holder and which extends and contracts according to movement of the first casing and the second casing at the time of sliding. The elastic member is so configured that the elastic member contracts most in an in-sliding state of the first casing and the second casing and that its extension amount in the closed state is smaller than its extension amount in the open state, and the hinge mechanism becomes able to function when the first casing and the second casing are brought into the open state.

As above-mentioned, according to embodiments of the present technology, an apparatus opening and closing mechanism and an information apparatus can be provided in which a slide mechanism and a hinge mechanism can be used jointly and operability can be enhanced.

BRIEF DESCRIPTION OF THE DRAWINGS

FIG. 11 illustrates the states of a roller in the default state, the in-sliding state, and the sliding-completed state, respectively;

FIG. 12 illustrates the states of the hinge mechanism in the default state, the sliding-completed state, and the tilted state, respectively;

FIG. 13 shows a plan view and side views of the hinge mechanism; and

FIG. 14 illustrates the states of the hinge mechanism in the default state, the sliding-completed state, a pop-up state, and the tilted state, respectively.

DETAILED DESCRIPTION OF THE PREFERRED EMBODIMENT

Now, a preferred embodiment of the present technology will be described in detail below, referring to the accompanying drawings. Incidentally, in the present specification and the drawings, those components which have substantially the same function or configuration will be denoted by the same reference symbol, and redundant description thereof will be omitted.

Incidentally, description will be made in the following order.

1. General Configuration of Information Apparatus
2. Slide Mechanism
3. Hinge Mechanism <1. General Configuration of Information Apparatus>

Figure 1:
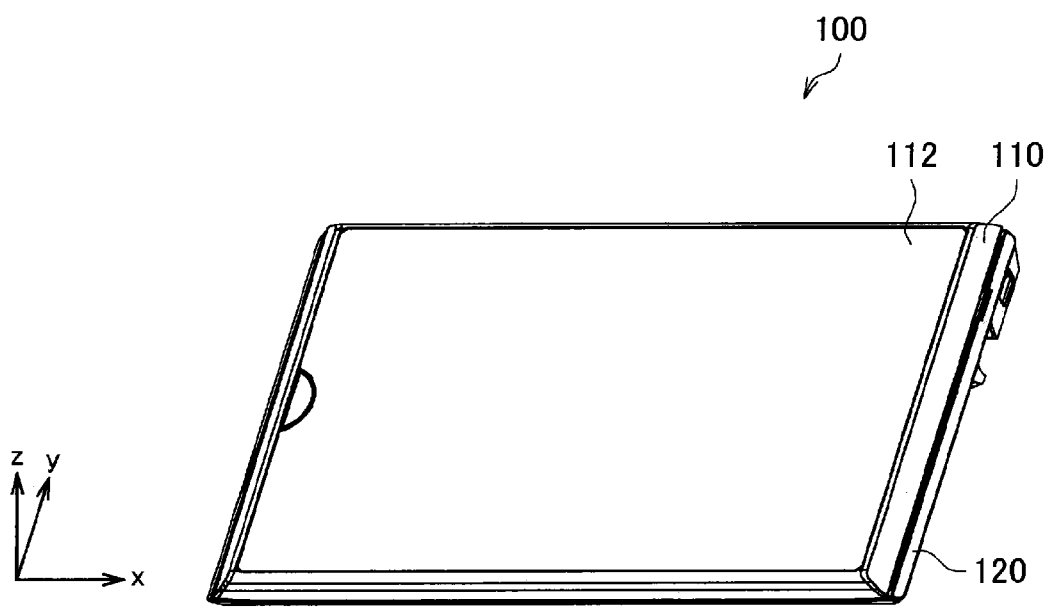
FIG. 1 is a schematic perspective view showing a default state of an information apparatus according to an embodiment of the present technology.
Figure 2:
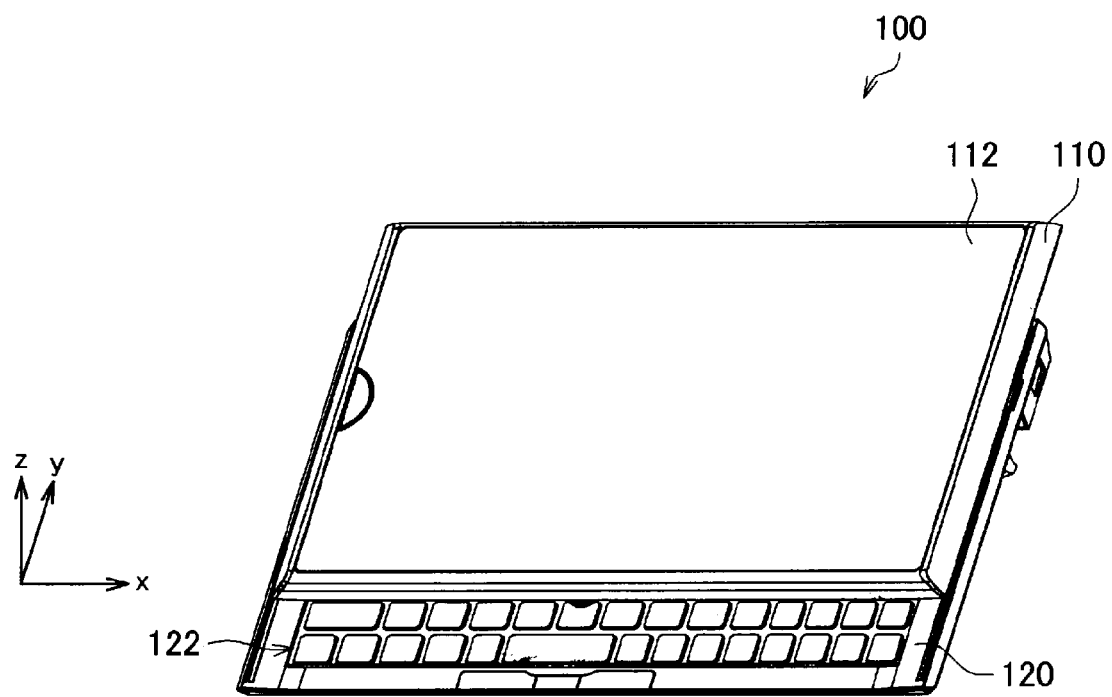
FIG. 2 is a schematic perspective view showing an in-sliding state (half-slid or partly slid state) of the information apparatus according to the embodiment.
Figure 3:
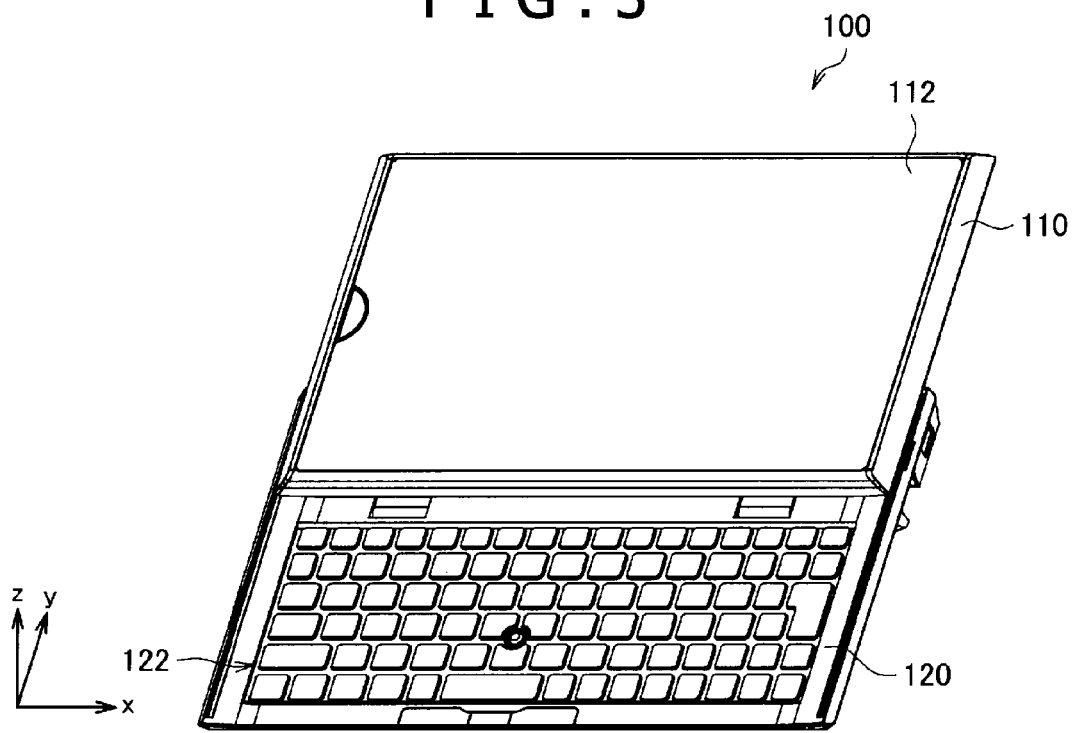
FIG. 3 is a schematic perspective view showing a sliding-completed state (fully slid state) of the information apparatus according to the embodiment.

First, referring to FIGS. 1 to 4, general configuration of an information apparatus 100 according to an embodiment of the present technology will be described. FIG. 1 is a schematic perspective view showing a default state of an information apparatus 100 according to the present embodiment of the present technology; FIG. 2 is a schematic perspective view showing an in-sliding state (half-slid or partly slid state) of the information apparatus 100 according to the present embodiment; FIG. 3 is a schematic perspective view showing a sliding-completed state (fully slid state) of the information apparatus 100 according to the present embodiment; and FIG.

4 is a schematic perspective view showing a tilted state of the information apparatus 100 according to the present embodiment.

The information apparatus 100 according to the present embodiment includes a first casing 110 having a display unit 112, and a second casing 120 having a keyboard 122, the casings being movably connected to each other. The first casing 110 and the second casing 120 are, for example, both flat plate-like in shape and formed in the same size.

The first casing 110 and the second casing 120 are so provided that, when the information apparatus 100 is in a closed state, as shown in FIG. 1, the first casing 110 is located on the second casing 120. In other words, the first casing 110 and the second casing 120 are in the state of being stacked in a z-direction. In this instance, the first casing 110 is provided in such a relation to the second casing 2 that the display unit 112 possessed by the first casing 110 is located on the outer side of the apparatus (specifically, on the side opposite to that surface of the first casing 110 which faces the second casing 120). Therefore, even when the information apparatus 100 is in the closed, default state, the user can look at information such as contents displayed on a display surface of the display unit 112.

The first casing 110 and the second casing 120 are connected by a slide mechanism (refer to reference symbol 160 in FIG. 6) in such a manner that they can be moved in a predetermined sliding direction. As shown in FIG. 2, in the present embodiment, the first casing 110 can be slid by the slide mechanism in a y-direction (which is a sliding direction) relative to the second casing 120. When the first casing 110 is slid in the y-axis positive direction, part of the second casing 120 is exposed. In that area of the second casing 120 which is exposed when the first casing 110 is slid, the keyboard 122 is provided, as shown in FIGS. 2 and 3. When the first casing 110 is slid to a position which can be reached when the first casing 110 is moved as far as possible, the keyboard 122 possessed by the second casing 120 is entirely exposed, as shown in FIG. 3, so that the keyboard 122 is in a usable state.

Figure 4:
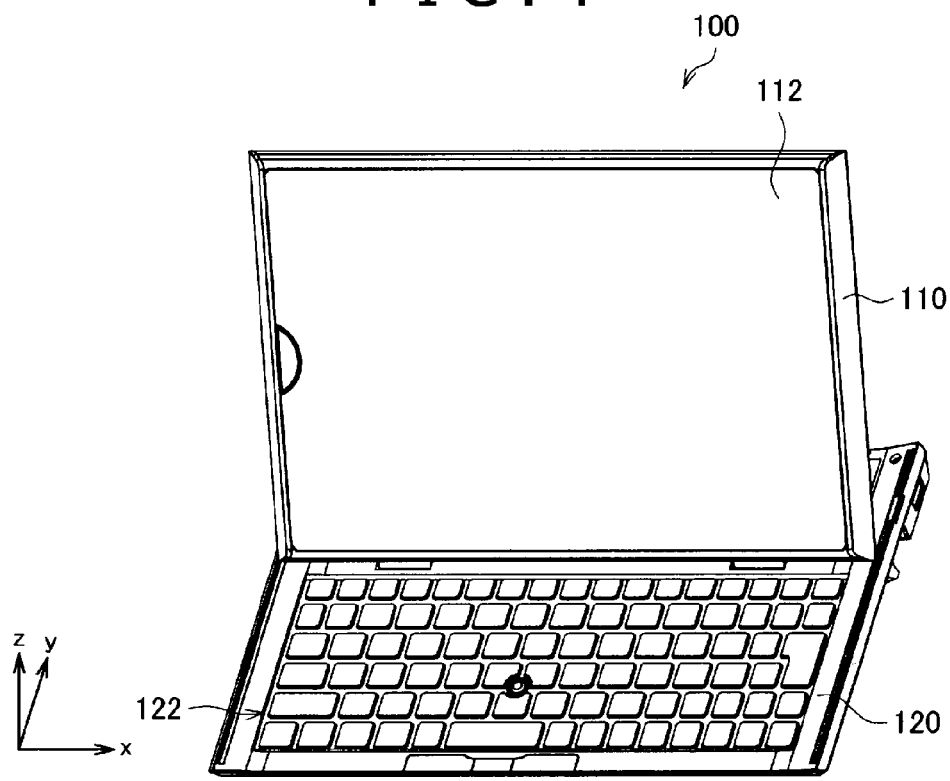
FIG. 4 is a schematic perspective view showing a tilted state of the information apparatus according to the embodiment.

Furthermore, the information apparatus 100 according to the present embodiment has a hinge mechanism which enables the first casing 110 and the second casing 120 to be rotated. When the sliding-completed state is established as shown in FIG. 3, the hinge mechanism enables the first casing 110 to be rotated relative to the second casing 120, as shown in FIG. 4. The user can use the information apparatus 100 just like a clamshell-type personal computer by rotating the first casing 110 so that the display unit 112 is easy to see.

In the case where the information apparatus 100 according to the present embodiment has a touch panel (not shown) in the area corresponding to the display unit 112 of the first casing 110, input operations can be carried out by putting an operating element, such as a finger, into contact with the display unit 112 in the default state shown in FIG. 1. Besides, in the case where it is easier to input information by use of the keyboard 122 as in the case of inputting a text, the first casing 110 is slid relative to the second casing 120, as shown in FIGS. 2 to 4, whereby it is made possible to input information through the keyboard 122. In this instance, the inputting operation is more facilitated by rotating the first casing 110.

Thus, the information apparatus 100 according to the present embodiment can be changed in form by use of the slide mechanism and the hinge mechanism, and these mechanisms are so configured that their forms can be easily changed and that the apparatus can be enhanced in usability and operability. Now, the configuration of the information apparatus 100 according to the present embodiment will be described more in detail below.

<2. Slide Mechanism>

Figure 5:
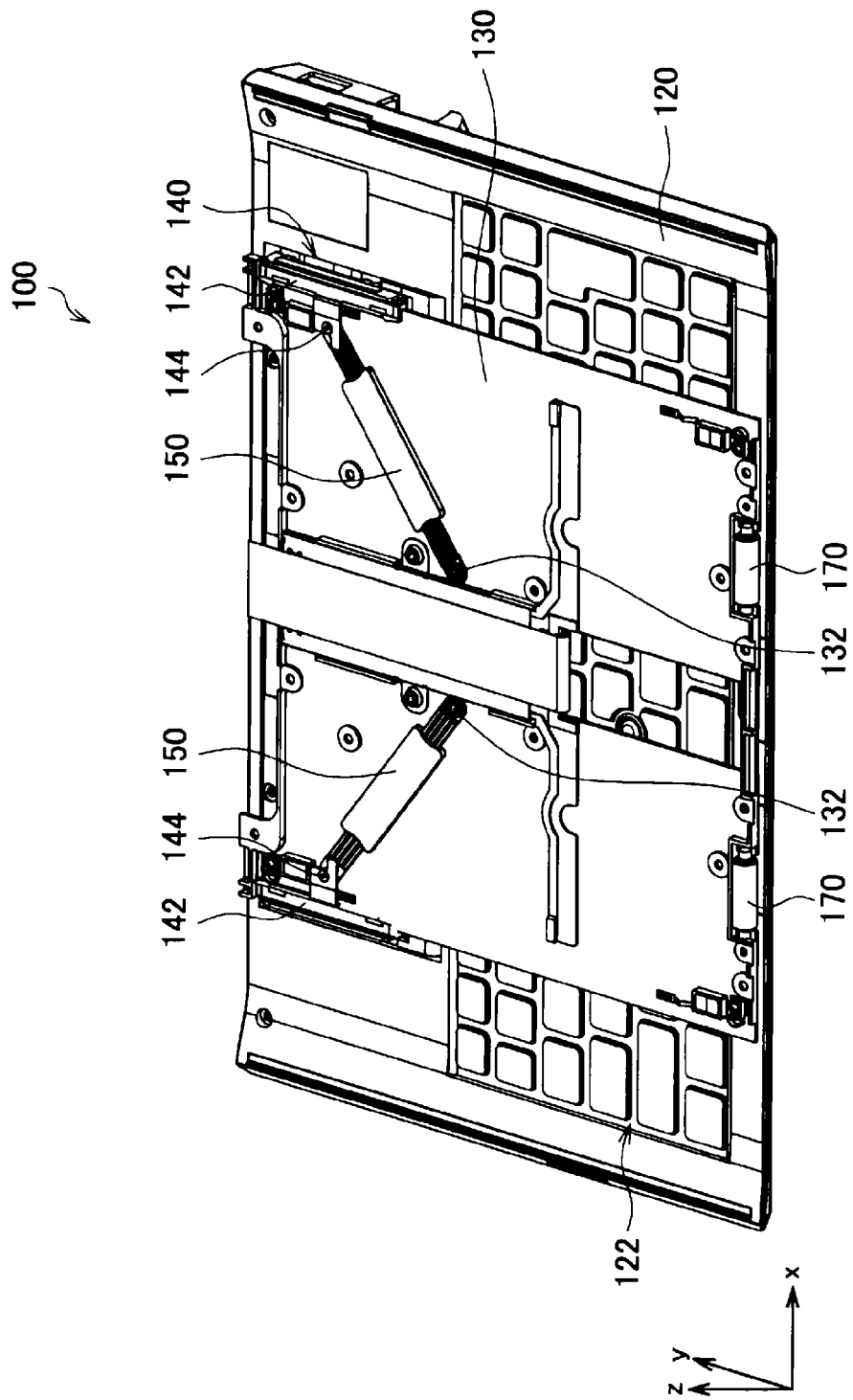
FIG. 5 is a schematic perspective view showing a state in which a first casing of the information apparatus shown in FIGS. 1 to 4 has been removed, particularly showing the default state.
Figure 7:
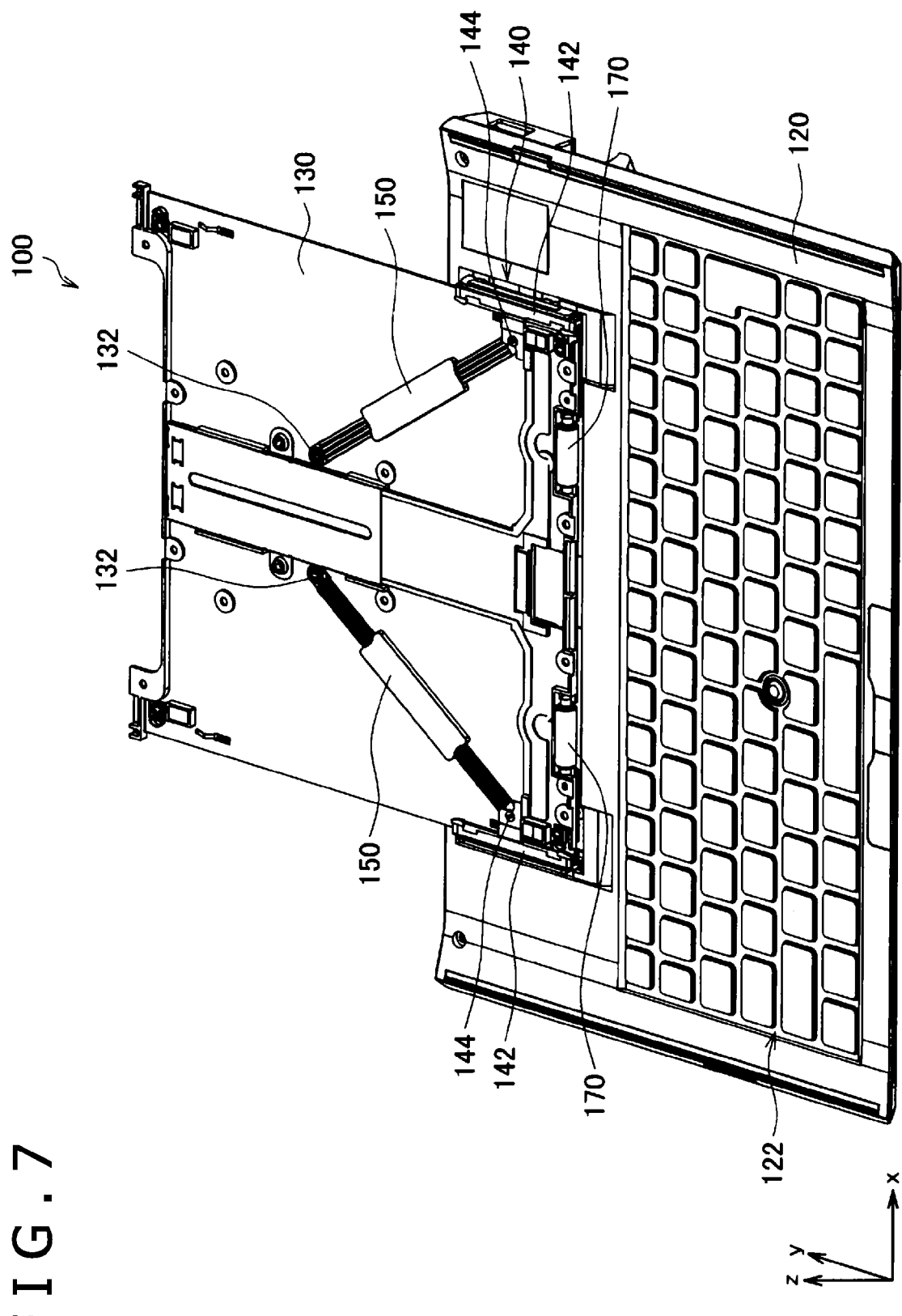
FIG. 7 is a schematic perspective view showing the state in which the first casing of the information apparatus shown in FIGS. 1 to 4 has been removed, particularly showing the sliding-completed state.
Figure 8:
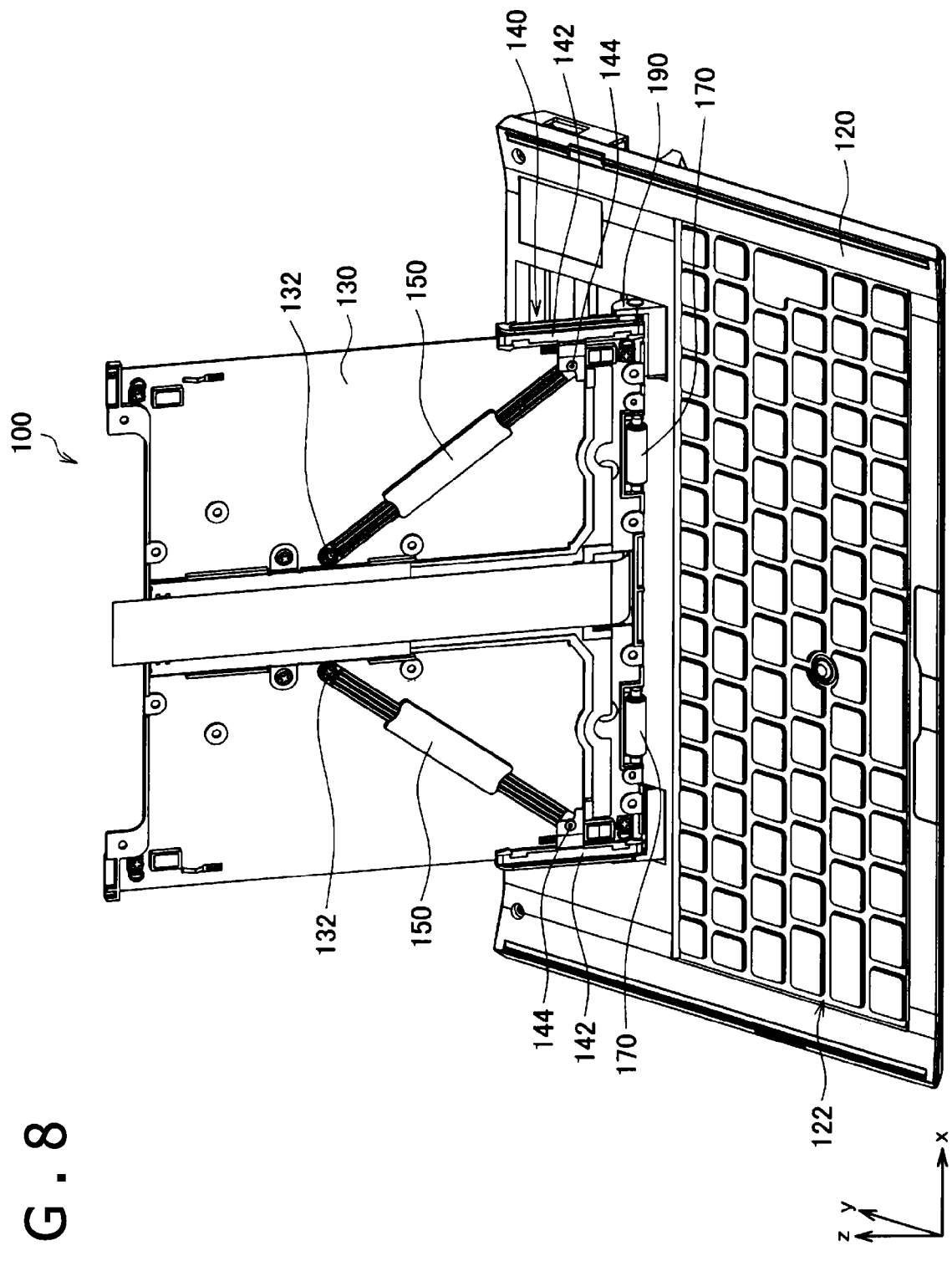
FIG. 8 is a schematic perspective view showing the state in which the first casing of the information apparatus shown in FIGS. 1 to 4 has been removed, particularly showing the tilted state.
Figure 9:
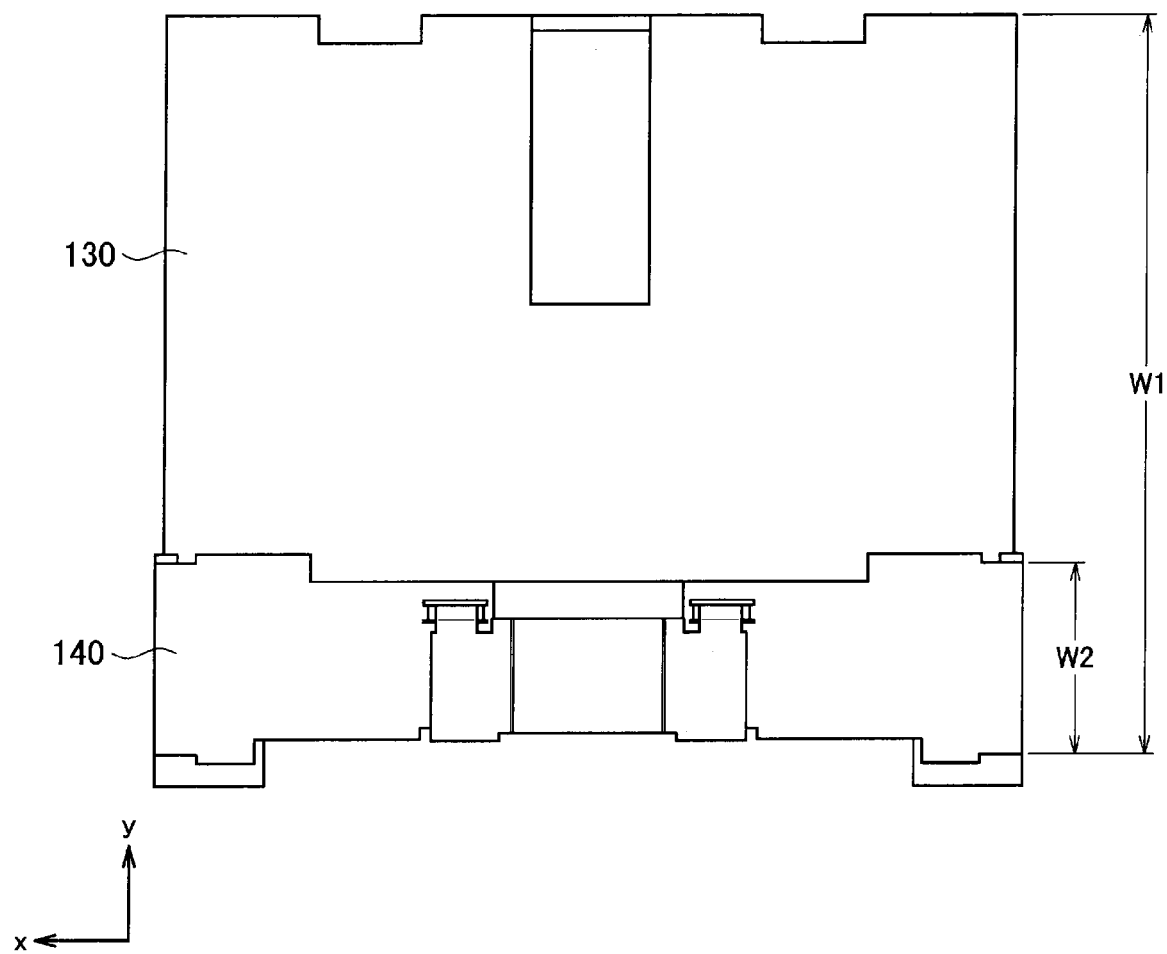
FIG. 9 illustrates sizes of a display holder and a base holder.
Figure 10:
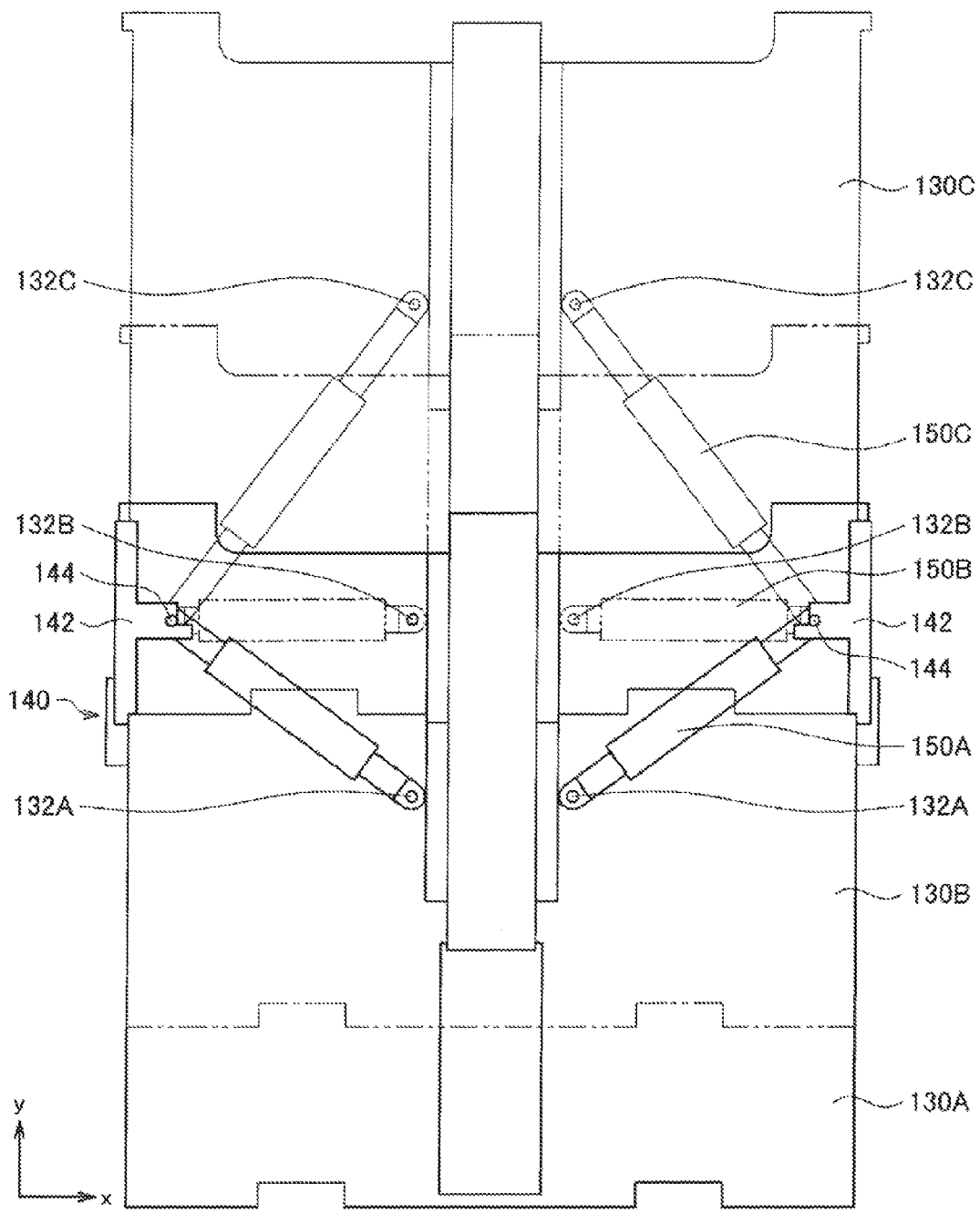
FIG. 10 illustrates a movable range of the display holder relative to the base holder.

First, based on FIGS. 5 to 10, the slide mechanism 160 of the information apparatus 100 according to the present embodiment will be described. Incidentally, FIGS. 5 to 8 are schematic perspective views showing the state in which the first casing 110 of the information apparatus 100 shown in FIGS. 1 to 4 has been removed; particularly, FIG. 5 shows the default state, FIG. 6 the in-sliding state, FIG. 7 the sliding-completed state, and FIG. 8 the tilted state. FIG. 9 illustrates the sizes of a display holder 130 and a base holder 140. FIG. 10 illustrates a movable range of the display holder 130 relative to the base holder 140.

When the first casing 110 is removed in the default state of the information apparatus 100 shown in FIG. 1, the display holder 130, which is a first holder fixed to the first casing 110, and the base holder 140, which is a second holder fixed to the second casing 120, are visually confirmed, as shown in FIG. 5. The slide mechanism 160 includes the display holder 130, the base holder 140, and actuator springs 150 each connected to them.

The display holder 130 is a plate-like member provided between the first casing 110 and the second casing 120, and is so provided that it can be slid relative to the second casing 120, as one body with the first casing 110. Two edges of the display holder 130 which are parallel to the sliding direction (y-direction) are supported by support sections 142 of the base holder 140 fixed to the second casing 120.

The base holder 140 is provided at a part of that surface of the second casing 120 which faces the first casing 110. Specifically, as shown in FIG. 5, the base holder 140 is provided in an area on the side opposite to the side of the installation area of the keyboard 122 in the sliding direction. In addition, the base holder 140 is provided with the support sections 142 for slidably supporting the two edges of the display holder 130 which are parallel to the sliding direction. The support sections 142 are components of the base holder 140, and they may be formed integrally with the base holder 140 or may be provided as separate bodies from the base holder 140.

Figure 6:
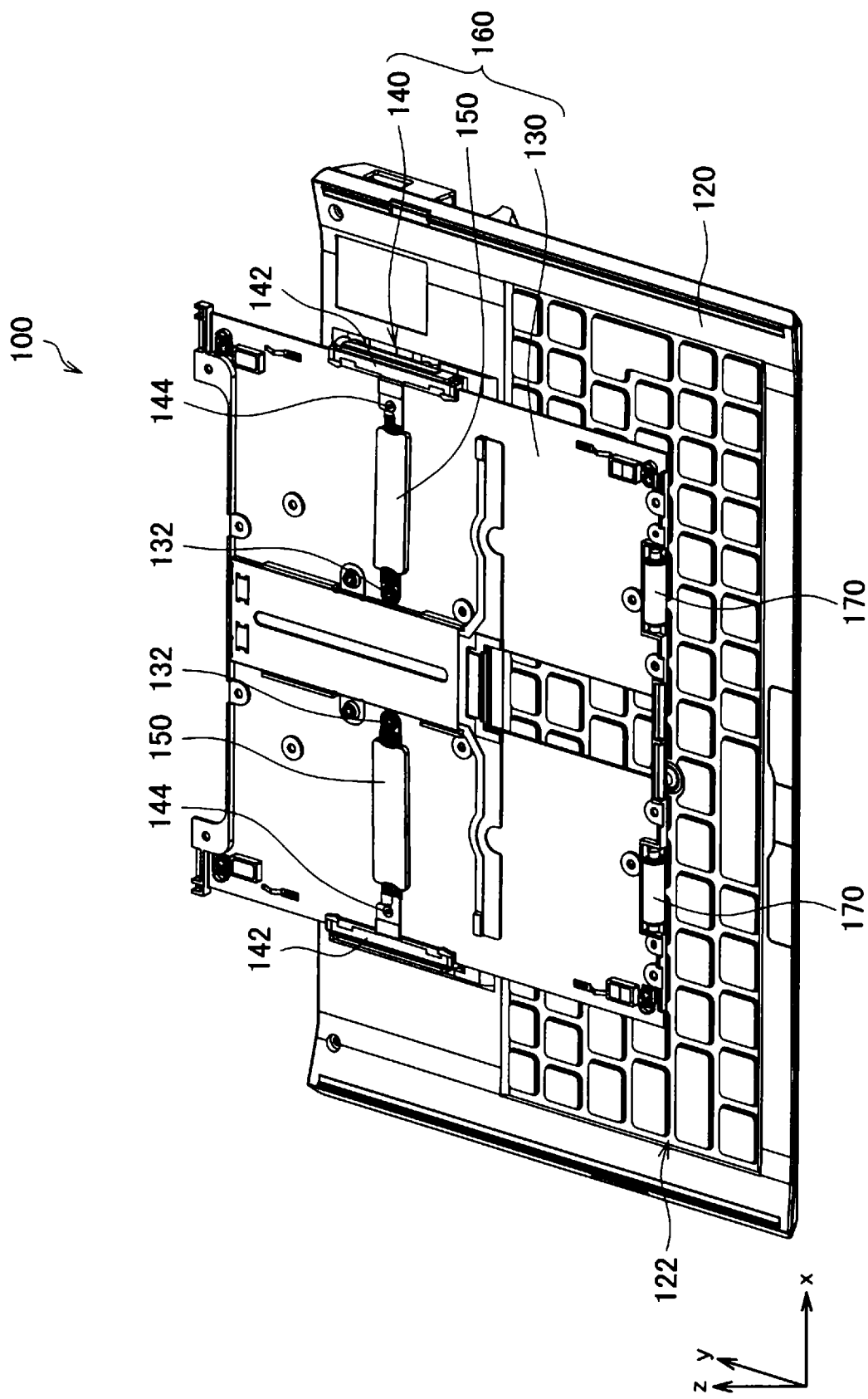
FIG. 6 is a schematic perspective view showing the state in which the first casing of the information apparatus shown in FIGS. 1 to 4 has been removed, particularly showing the in-sliding state.

As shown in FIG. 5, the display holder 130 and the base holder 140 are connected to each other by actuator springs 150 each of which has one end fixed to the display holder 130 and the other end fixed to the base holder 140. When a force for pushing out in the y-axis positive direction is exerted on the first casing 110, starting from the default state shown in FIG. 5, the first casing 110 is slid in the y-axis direction as shown in FIG. 6. Thereafter, the first casing 110 is stopped when an end portion on the y-axis negative direction side of the first casing 110 is located at an end portion on the keyboard 122 side of the base holder 140, as shown in FIG. 7. This stop position of the first casing 110 will be referred to also as "maximum slide position." When the first casing 110 is slid to the maximum slide position shown in FIG. 7, the hinge mechanism is enabled to exhibit its function, whereby the display holder 130 can be rotated and the first casing 110 can be thereby rotated, as shown in FIG. 8.

Here, the information apparatus 100 according to the present embodiment is so configured that the first casing 110 can be slid to the maximum slide position with a small pushing-in amount. In addition, the information apparatus 100 is so configured that the sliding amount from the default state to the maximum slide position of the first casing 110 can be enlarged in order to secure a sufficient installation area for the keyboard 122, without enlarging the overall size of the apparatus.

[In Regard of Sliding Amount]

The sliding amount by which the first casing 110 can be slid relative to the second casing 120 (referred to also as "maximum slide amount") is the difference between the width W1 of the display holder 130 in the sliding direction and the width W2 of the base holder 140 in the sliding direction. Here, the base holder 140 is so configured as to surround the display holder 130. Therefore, as the base holder 140 is made larger, the force of pushing in the first casing 110 fixed to the display holder 130 at the time of sliding is increased, and chattering in the rotating direction at the time of sliding can be decreased. Besides, with the width W2 of the base holder 140 increased, a holding-down part of the hinge mechanism (described later) is increased, so that strength against torque in the tilting direction (torsional torque) can be augmented.

In view of the above-mentioned characteristic properties, normally, it is desirable for the width W2 of the base holder 140 in the sliding direction to be not less than about ⅓ times the width W1 of the display holder 130. In the case where there is a restriction such that the overall apparatus size cannot be enlarged, however, an attempt to maintain the width relationship between the base holder 140 and the display holder 130 results in that it is difficult to secure an area sufficient for installing a keyboard 122 so sized as to be easy to operate. In addition, there results chattering of the information apparatus 100 at the time of sliding.

Taking this into account, in the information apparatus 100 according to the present embodiment, the width W2 of the base holder 140 in the sliding direction is set to be less than about ⅓ times the width W1 of the display holder 130, whereby the maximum slide amount is enlarged. In this case, for preventing chattering at the time of sliding, for example, guide members (not shown) for movement along the second casing 120 are provided at two edges of the first casing 110 which are parallel to the sliding direction. The guide members can, for example, be each composed of a wall portion protruding from the first casing 110 to the second casing 120 side.

[In Regard of Actuator Springs]

The slide mechanism 160 of the information apparatus 100 according to the present embodiment is provided with the actuator springs 150 so that the first casing 110 can be slid to the maximum slide position with a small pushing-in amount. As above-mentioned, the actuator springs 150 each have one end fixed to the display holder 130 by the first fixing section 144, and has the other end fixed to the base holder 140 by a second fixing section 132. The information apparatus 100 is provided with the two actuator springs 150 arranged symmetrically about a center line which passes through the center in the x-direction of the information apparatus 100 and which is parallel to the y-direction.

The manner in which the actuator springs 150 are arranged will be described more in detail, referring to FIG. 10. FIG. 10 shows the positions of the display holder 130 relative to the base holder 140 in the default state which is the closed state (solid line), in the in-sliding state wherein the actuator springs 150 are contracted most (two-dotted chain line), and in the sliding-completed state which is the open state (thin line), respectively. In FIG. 10, the components in the default state are denoted by reference numerals accompanied by "A," the components in an in-sliding state in which the actuator springs 150 are contracted most are denoted by reference numerals accompanied by "B," and the components in the sliding-completed state are denoted by reference numerals accompanied by "C." In addition, the default state of FIG. 10 corresponds to FIG. 5, the in-sliding state in which the actuator springs 150 are contracted most corresponds to FIG. 6, and the sliding-completed state corresponds to FIG. 7.

Each of the actuator springs 150 is so provided that it is contracted most at a predetermined position in the in-sliding state (symbol 150B). Therefore, the actuator spring is extended in the default state and in the sliding-completed state (symbols 150A and 150C). As the first casing 110 is pushed out in the y-axis positive direction, the actuator spring 150 extended in the default state is gradually contracted, to get in the most contracted state. This position will be referred to also as "inversion point." After passing through the inversion point, the actuator spring 150 will, due to its extending property, extend in the y-axis positive direction without need for any further external force for pushing out the first casing 110 in the y-axis positive direction. Thereafter, in the condition where each of the actuator springs 150 is extended most, the display holder 130 is stopped, resulting in the sliding-completed state (fully slid state).

When the actuator springs 150 are so provided that their extension in the default state and their extension in the sliding-completed state are equal, with the inversion point as a boundary, the maximum slide amount can be made to be the greatest. In this case, however, the inversion point is located at the center position in the y-direction of the first casing 110. This results in that the pushing-in amount required for moving the first casing 110 from the default state to the inversion point beyond which the first casing 110 is automatically slid is also enlarged, leading to a deteriorated operability.

Taking this into account, in the present embodiment, as shown in FIG. 10, the extension amount of the actuator spring 150A in the default state is set to be smaller than the extension amount of the actuator spring 150C in the sliding-completed state. This ensures that the inversion point of the actuator springs 150 can be set on the y-axis positive direction side relative to the center position in the y-direction; therefore, the amount of movement of the first casing 110 from the default state to the inversion point can be made smaller. Accordingly, the first casing 110 can be slid to the maximum slide position with a small pushing-in amount, whereby a pleasant usability can be provided.

Incidentally, the actuator springs 150 are laid out in the information apparatus 100, taking into account both the length of the springs necessary in the sliding-completed state and avoidance of interference with FPCs (Flexible Printed Circuits).

[In Regard of Rollers]

In the process of sliding of the first casing 110 relative to the second casing 120, the display holder 130 fixed to the first casing 110 is moved in the sliding direction while facing the keyboard 122 and a palm rest 126 possessed by the second casing 120. In this instance, if the first casing 110 is pushed toward the second casing 120, the display holder 130 would interfere with the keyboard 122 and/or the palm rest 126, possibly damaging these components.

In view of this, in the information apparatus 100 according to the present embodiment, as shown in FIG. 11, a roller 170 capable of rolling in the sliding direction of the first casing 110 is provided at such a position as to face the second casing 120. The roller 170 can be provided, for example, at an end portion on the y-axis negative direction side of the first casing 110. The roller 170 is formed of an elastic material, for example, rubber. At least one such roller 170 is provided, and, for example, two such rollers 170 may be provided to be juxtaposed in the x-direction, as shown in FIG. 5.

As shown in FIG. 11, in the default state, the roller 170 is in the state of being mounted on the second casing 120. In this instance, a gap is present between the display holder 130 and each of the keyboard 122 and the palm rest 126. When the first casing 110 is pushed out in the y-axis positive direction from the default state, the roller 170 rolls on the keyboard 122 and the palm rest 126 of the second casing 120, during when the first casing 110 is moved in the y-axis positive direction, to be positioned into the sliding-completed state.

With such roller(s) 170 provided, the contact of the display holder 130 with the keyboard 122 and the palm rest 126 at the time of sliding can be prevented from occurring, and the keyboard 122 and the palm rest 126 can be protected.

<3. Hinge Mechanism>

When the first casing 110 is slid from the default state and the sliding-completed state is established, the hinge mechanism for rotation of the first casing 110 relative to the second casing 120 becomes able to exhibit its function. By rotating the first casing 110 on the basis of the function of the hinge mechanism, it is possible to use the information apparatus 100 just like a clamshell-type personal computer, thereby enhancing operability. Now, based on FIGS. 12 to 14, the hinge mechanism in the information apparatus 100 according to the present embodiment will be described in detail below. Incidentally, FIG. 12 illustrates the states of the hinge mechanism 190 in the default state, in the sliding-completed state, and in the tilted state, respectively. FIG. 13 shows a plan view and side views of the hinge mechanism 190. FIG. 14 illustrates the states of the hinge mechanism 190 in the default state, the sliding-completed state, a pop-up state and a tilted state, respectively.

[General Configuration of Hinge Mechanism]

As shown in FIG. 12, the hinge mechanism 190 is provided between the first casing 110 and the second casing 120, at an end portion on the y-axis positive direction side, in the default state. The hinge mechanism 190 cannot function until the information apparatus 100 is brought into the sliding-completed state; after the sliding-completed state is established, the first casing 110 becomes able to be rotated so that the surface of the display unit 112 thereof approaches the keyboard 122 side. The state in which the first casing 110 can be rotated will be referred to also as "the tilted state."

As shown in FIG. 13, the hinge mechanism 190 includes a first hinge bracket 191 fixed to the display holder 130 on the first casing 110 side, and a second hinge bracket 195 fixed to the base holder 140 on the second casing 120 side.

Either one of the first hinge bracket 191 and the second hinge bracket 195 is provided so as to be rotatable relative to a rotating shaft 193, whereas the other is fixed to the rotating shaft 193. In the present embodiment, the first hinge bracket 191 is provided to be rotatable relative to the rotating shaft 193, and the second hinge bracket 195 is fixed to the rotating shaft 193. Naturally, a configuration may be adopted in which the first hinge bracket 191 is fixed to the rotating shaft 193 whereas the second hinge bracket 195 is provided to be rotatable relative to the rotating shaft 193. In addition, on the rotating shaft 193, a first cam 196 and a second cam 197 are provided on the further x-axis positive direction side of the second hinge bracket 195 in such a manner that they are pressed by a coned disc spring 198. A frictional force is generated between the two cams 196 and 197 thus provided. By this frictional force, the first casing 110 rotated and the second casing 120 can be fixed at a predetermined tilted position.

Incidentally, the hinge mechanism 190 shown in FIG. 13 is provided with a torsion spring 194 on that portion of the rotating shaft 193 which is located between the first hinge bracket 191 and the second hinge bracket 195. The torsion spring 194 is a component which is necessary for providing the hinge mechanism 190 with a pop-up function, as will be described later. Therefore, in order to render the first casing 110 and the second casing 120 rotatable and to realize a function of fixing them in a predetermined rotational position, it is unnecessary to provide the torsion spring 194.

When the first casing 110 and the second casing 120 are put in the sliding-completed state, the user can rotate (tilt) the first casing 110 relative to the second casing 120, with the rotating shaft 193 of the hinge mechanism 190 as a center of rotation. When the force exerted by the user for rotating the first casing 110 so that the display unit 112 approaches the keyboard 122 of the second casing 120 is greater than the frictional force generated between the two cams 196 and 197 by the coned disc spring 198, the first casing 110 is rotated. Thereafter, when the user stops rotating the first casing 110 (in other words, the force for rotating the first casing 110 is eliminated) after the first casing 110 and the second casing 120 are made to form a desired angle therebetween, a frictional force is generated between the two cams 196 and 197 by the coned disc spring 198. This ensures that the first casing 110 and the second casing 120 can maintain the desired angle therebetween.

Incidentally, when the sliding-completed state is established, as shown in FIG. 12, a gap d1 is generated between the rotating shaft 193 and the first casing 110, so that the first casing 110 and the second casing 120 will not interfere with each other even if the first casing 110 is rotated so as to bring the display unit 112 closer to the keyboard 122. With such a condition established, the user becomes able to rotate (tilt) the first casing 110 by hand. Incidentally, by regulating the gap d1, a gap d2 between the first casing 110 and the palm rest 126 of the second casing in the tilted state can be controlled, whereby interference between the first casing 110 and the palm rest 126 can be obviated. This enables the display unit 112 possessed by the first casing 110 to be raised without need to cut out the casing, and, accordingly, design quality of the apparatus can be maintained.

[Hinge Mechanism Having Pop-Up Function]

In the case of sliding the first casing 110 for the purpose of using the information apparatus 100 in the form of a clamshell-type personal computer, normally, operational load on the user can be lessened if the first casing 110 is automatically rotated upon completion of the sliding of the first casing 110. In view of this, the hinge mechanism 190 may be provided with the torsion spring 194 so as to realize a pop-up function such that the casing 110 is automatically rotated when the sliding-completed state is attained. Such a pop-up function can be realized, for example, by controlling the magnitude of the frictional force between the cams 196 and 197 of the hinge mechanism 190 and the magnitude of the torsional torque of the torsion spring 194.

As a configuration in which the hinge mechanism 190 is provided with the torsion spring 194, there may be contemplated, for example, a configuration as shown in FIG. 13 wherein the torsion spring 194 is wound around that portion of the rotating shaft 193 which is located between the first hinge bracket 191 and the second hinge bracket 195. One end of the torsion spring 194 is fixed to the first hinge bracket 191, and the other end is fixed to the second hinge bracket 195. Consequently, the magnitude of the torsional torque of the torsion spring 194 varies according to the angle between the first hinge bracket 191 and the second hinge bracket 195, namely, the angle between the first casing 110 and the second casing 120.

When the torsion spring 194 is said to be in a reference state when the information apparatus 100 is opened at 90°, then the torsion spring 194 is provided in the information apparatus 100 so as to get in the reference state when the angle formed between the display unit 112 of the first casing 110 and the keyboard 122 of the second casing 120 is 90°. In other words, when the information apparatus 100 is in the sliding-completed state, the torsional torque of the torsion spring 194 is at maximum, and when the angle formed between the display unit 112 and the keyboard 122 is 90°, the torsional torque of the torsion spring 194 is zero. Therefore, when the first casing 110 is not rotated relative to the second casing 120, the torsion spring 194 is generating a torsional torque acting in such a direction that the display unit 112 of the first casing 110 approaches the keyboard 122 of the second casing 120.

Since the pop-up function is realized by use of such a torsion spring 194, the hinge mechanism 190 in the present embodiment is so set that the torsional torque of the torsion spring 194 is greater than the frictional force between the cams 196 and 197 while the opening/closing angle is in the range from 0° to a predetermined angle (pop-up angle) θ. Here, the opening/closing angle is the angle formed between the first casing 110 and the second casing 120, with the opening/closing angle in the sliding-completed state being 0°. For example, when θ=10°, while the opening/closing angle is in the range of 0° to 10°, the frictional force between the cams 196 and 197 is smaller than the torsional torque of the torsion spring 194, so that the first casing 110 is automatically rotated under the action of the torsional torque.

It is ensured that when the opening/closing angle exceeds 10°, on the other hand, the frictional force between the cams 196 and 197 becomes greater than the torsional torque of the torsion spring 194. Therefore, when the first casing 110 is rotated by not less than 10° relative to the second casing 120, rotation of the first casing 110 is stopped by the frictional force between the cams 196 and 197, whereby the opening/closing angle is maintained. To further enlarge the opening/closing angle, it suffices for the user to rotate the first casing 110 by hand so that the display unit 112 approaches the keyboard 122. Incidentally, the torsional torque of the torsion spring 194 is gradually weakened as the opening/closing angle approaches 90°. Specifically, beyond the predetermined angle θ, as the opening/closing angle approaches 90°, the torsional torque approaches the ordinary hinge mechanism in which the first casing 110 is moved under only the frictional force between the cams 196 and 197; accordingly, the user can rotate the first casing 110 manually and can stop the first casing 110 in a free manner.

Thus, by controlling the magnitude of the frictional force between the cams 196 and 197 of the hinge mechanism 190 and the magnitude of the torsional torque of the torsion spring 194, it can be ensured that the first casing 110 is popped up when the sliding-completed state is reached. Incidentally, during the transition of the information apparatus 100 from the default state to the sliding-completed state, the torsional torque of the torsion spring 194 tends to move the first casing 110 so that the display unit 112 approaches the keyboard 122, but the first casing 110 is not rotated because the end portion on the y-axis negative direction side of the first casing 110 makes contact with the second casing 120. In such a condition, the end portion of the first casing 110 is pressing against the second casing 120; however, it is possible, by controlling the frictional force between the cams 196 and 97 or by enhancing the elasticity of the rollers 170, to prevent the keyboard 122 and the palm rest 126 from being damaged.

The slide mechanism 160 and the hinge mechanism in the information apparatus 100 according to one embodiment of the present technology have been described above. According to the configuration of the information apparatus 100 in the present embodiment, the first casing 110 can be slid to the maximum slide position with a small pushing-in amount, whereby a pleasant operability can be provided. In addition, it is ensured that the hinge mechanism functions when the sliding of the first casing 110 is completed (when the first casing 110 is fully slid), whereby the first casing 110 can be rotated so that its display unit 112 approaches the keyboard 122 of the second casing 120. Further, by controlling the magnitude of the frictional force between the cams 196 and 197 of the hinge mechanism 190 and the magnitude of the torsional torque of the torsion spring 194, it is also possible to automatically rotate the first casing 110. With such a sliding mechanism 160 and such a hinge mechanism used jointly, the information apparatus 100 according to the present embodiment can realize high operability.

While a preferred embodiment of the present technology has been described in detail above while referring to the accompanying drawings, the invention is not restricted to such an example as above-described. It is obvious that ideas of various modifications and alterations within the scope of the technical thought described in the claims can come upon persons who have common knowledge in the technical field to which the present technology pertains, and, naturally, such modifications and alterations are construed as embraced in the technical scope of the present technology.

For instance, while the reference state of the torsion spring 194 has corresponded to an opening/closing angle of 90° in the above embodiment, the present technology is not restricted to such an example, and the angle corresponding to the reference state of the torsion spring 194 can be appropriately modified according to the configuration of the hinge mechanism 190. In addition, while the pop-up angle θ in the case where the hinge mechanism 190 includes a pop-up mechanism has been 10° in the above embodiment, the present technology is not limited to such an example. The pop-up angle θ can, for example, be set to an angle such that the display unit 112 is easy for the user to see when the information apparatus 100 is used with the display unit 112 set closer to the keyboard 122. Besides, a configuration in which the first casing 110 is popped up from the sliding-completed state to a preset angle θ can be realized by appropriately modifying the diameter of the torsion spring 194 and/or the characteristics of the frictional member including the two cams 196, 197 and the coned disc spring 198.

What is claimed is:

1. An apparatus opening and closing mechanism comprising:
    a roller;
    a slide mechanism by which a first casing and a second casing are slidably connected to each other and which permits transition of position state of the first casing and the second casing between a closed state in which an overlapping region of the first casing and the second casing is maximized and an open state in which the overlapping region of the first casing and the second casing is minimized; and
    a hinge mechanism by which the first casing and the second casing are rotatably connected to each other,
    wherein the slide mechanism includes
        a first holder fixed to the first casing,
        a second holder which is fixed to the second casing and by which the first holder is supported so as to be movable in a sliding direction, and
        an elastic member which has one end fixed to the first holder and the other end fixed to the second holder and which extends and contracts according to movement of the first casing and the second casing at the time of sliding,
    the second casing having a plurality of keys arranged on a surface thereof,
    the roller being connected to the first casing and configured to roll on at least some of the keys the second casing when slidable movement occurs between the first casing and the second casing, said roller being positioned to ensure that during the slidable movement contact between the plurality of keys and a surface of the first casing which faces the surface of the second casing having the plurality of keys thereon is prevented from occurring, the elastic member is so configured that the elastic member contracts most in an in-sliding state of the first casing and the second casing and that its extension amount in the closed state is smaller than its extension amount in the open state, and the hinge mechanism becomes able to function when the first casing and the second casing are brought into the open state.

2. The apparatus opening and closing mechanism according to claim 1, wherein the difference between the width of the first holder in the sliding direction and the width of the second holder in the sliding direction is smaller than 1/3 times the larger one of the widths.

3. The apparatus opening and closing mechanism according to claim 2,
wherein the hinge mechanism includes:
a rotating shaft serving as a center of rotation for the first casing and the second casing;
a torque member which produces a torque in a rotating direction of the first casing and the second casing; and
a friction member which produces a frictional force for impeding movement of the first casing and the second casing in the rotating direction,
the frictional force produced by the friction member is smaller than the torque produced by the torque member when an opening/closing angle, which is an angle formed between the first casing and the second casing, is not greater than a predetermined angle, and
the frictional force produced by the friction member is greater than the torque produced by the torque member when the opening/closing angle is greater than the predetermined angle.

4. The apparatus opening and closing mechanism according to claim 3,
wherein the torque member has a torsion spring, and
the friction member includes two cams provided juxtaposedly in the direction of the rotating shaft, and a friction elastic member which presses the two cams.

5. The apparatus opening and closing mechanism according to claim 4, wherein in the open state, a rear end portion as an end portion of the first casing slid on the second casing by being pushed in at the time of transition from the closed state to the open state is located at a position deviated in a pushing-in direction from the position of the rotating shaft of the hinge mechanism in the sliding direction.

6. The apparatus opening and closing mechanism according to claim 1, wherein the roller has an elastic member.

7. The apparatus opening and closing mechanism according to claim 1,
wherein the hinge mechanism includes:
a rotating shaft serving as a center of rotation for the first casing and the second casing in a rotating direction;
a friction member which produces a frictional force for impeding movement of the first casing and the second casing in the rotating direction.

8. An information apparatus comprising:
a roller;
a first casing having a display unit for displaying information;
a second casing which is provided to overlap with the first casing and which has an input unit for input operations; and
an apparatus opening and closing mechanism including a slide mechanism by which the first casing and the second casing are slidably connected to each other and which permits transition of position state of the first casing and the second casing between a closed state in which an overlapping region of the first casing and the second casing is maximized and an open state in which the overlapping region of the first casing and the second casing is minimized, and a hinge mechanism by which the first casing and the second casing are rotatably connected to each other,
wherein the slide mechanism includes
a first holder fixed to the first casing,
a second holder which is fixed to the second casing and by which the first holder is supported so as to be movable in a sliding direction, and
an elastic member which has one end fixed to the first holder and the other end fixed to the second holder and which extends and contracts according to movement of the first casing and the second casing at the time of sliding,
the input unit of the second casing includes a plurality of keys arranged on a surface of the second casing,
the roller being connected to the first casing and configured to roll on at least some of the keys the second casing when slidable movement occurs between the first casing and the second casing, said roller being positioned to ensure that during the slidable movement contact between the plurality of keys and a surface of the first casing which faces the surface of the second casing having the plurality of keys thereon is prevented from occurring,
the elastic member is so configured that the elastic member contracts most in an in-sliding state of the first casing and the second casing and that its extension amount in the closed state is smaller than its extension amount in the open state, and
the hinge mechanism becomes able to function when the first casing and the second casing are brought into the open state.

9. A mobile device comprising:
a roller;
a first casing having a display unit for displaying information;
a second casing which is provided to overlap with the first casing and which has a plurality of keys arranged on a surface of the second casing; and
an apparatus opening and closing mechanism including a slide mechanism by which the first casing and the second casing are slidably connected to each other and which permits transition of position state of the first casing and the second casing between a closed state and an open state, and a hinge mechanism by which the first casing and the second casing are rotatably connected to each other,
wherein the slide mechanism includes
a first holder fixed to the first casing,
a second holder which is fixed to the second casing and by which the first holder is supported so as to be movable in a sliding direction, and
an elastic member which has one end fixed to the first holder and the other end fixed to the second holder and which extends and contracts according to movement of the first casing and the second casing at the time of sliding, the roller being connected to the first casing and configured to roll on at least some of the keys the second casing when slidable movement occurs between the first casing and the second casing, said roller being positioned to ensure that during the slidable movement contact between the plurality of keys and a surface of the first casing which faces the surface of the second casing having the plurality of keys thereon is prevented from occurring, the elastic member is so configured that the elastic member contracts most in an in-sliding state of the first casing and the second casing and that its extension amount in the closed state is smaller than its extension amount in the open state, and the hinge mechanism becomes able to function when the first casing and the second casing are brought into the open state.

10. The apparatus opening and closing mechanism according to claim 1, in which the roller is further positioned such that when the first casing and the second casing are in either the closed state or the open state contact between the plurality of keys and the roller is avoided.

* * * * *